Patented Dec. 7, 1948

2,455,745

UNITED STATES PATENT OFFICE 2,455,745

STABILIZATION OF STYRENE AND POLYMERIZABLE RING CHLORINATED STYRENES

Edwin R. Erickson, Niagara Falls, N. Y., assignor to Mathieson Chemical Corporation, a corporation of Virginia No Drawing. Application November 19, 1943,
Serial No. 510,924

10 Claims. (Cl. 260—650)

This invention relates to the stabilization of polymerizable unsaturated organic compounds and provides means for retarding or preventing the polymerization of such materials. The invention is particularly applicable to the inhibiting of polymerization of vinyl aromatic compounds such as styrene and various polymerizable substitution products of styrene, notably nuclear chlorinated styrenes. The invention also contemplates an improved vinyl aromatic product stabilized against polymerization.

These vinyl aromatic compounds are highly valuable in the production of useful plastics and rubberlike materials. In their use for such purposes an essential characteristic of these compounds is their ability to polymerize or to copolymerize with certain other materials. However, during their preparation, storage, and shipment, for instance, it is desirable to avoid their polymerization. In general, it is desirable to avoid polymerization of these materials under uncontrolled conditions which might result in the formation of polymers having undesirable characteristics.

Various methods have heretofore been suggested for preventing such polymerization, some of which are reasonably satisfactory, and others have been found to be ineffective under conditions usually encountered. Materials which have previously been suggested for inhibiting such polymerization include polyhydric phenols, such as tertiary butyl catechol, hydroquinone and the like.

In general, the use of the previously suggested inhibitors has been subject to one or more disadvantages, such as insufficient solubility of the inhibitor in the monomer to be protected, ineffectiveness, even though sufficiently soluble, too great or too little volatility for use under conditions involving distillation of the monomer, or too high cost. A further disadvantage, which has been extremely troublesome, is the difficulty in removing the inhibitor from the polymerizable material when it becomes desirable to effect the polymerization or co-polymerization reaction.

Many of the materials previously suggested as polymerization inhibitors, and found to be fairly effective in inhibiting the polymerization of styrene itself, have been found to be unsuitable for inhibiting polymerization of higher boiling homologues and substitution products of styrene. For example, in the distillation of these polymerizable materials it is usually required that polymerization be prevented throughout the distilling, fractionating and receiving apparatus. In the distillation of dichlorostyrene, for instance, hydroquinone is of such high volatility that it distills first out of the mixture leaving residual dichlorostyrene in the still and the fractionating apparatus unprotected by any inhibitor. Thus hydroquinone, while an effective inhibitor for styrene itself, has been found unsuitable for use as a polymerization inhibitor in dichlorostyrene or other higher boiling substituted styrene products, since it becomes separated from the polymerizable material during distillation, or the like, leaving some portion, at least, of the polymerizable material unprotected. Other previously suggested inhibitors, even though useful for inhibiting polymerization of styrene, are insufficiently soluble in some of the styrene homologues and consequently have been found unsuitable in this respect.

It is an object of my present invention to provide inhibitors for such polymerizable organic compounds which are effective and suited not only for the inhibiting of polymerization of the unsubstituted monomers but also of the homologues and substitution products thereof.

A further object of my invention is to provide a novel class of inhibitors from which may be selected specific members having such physical properties as to permit their effective use for the inhibiting of particular polymerizable materials under various conditions.

My new class of inhibitors may be defined generally as the alkoxy derivatives of hydroquinone or of other aromatic di-hydroxy and higher poly-hydroxy aromatic compounds having at least 2 free hydroxy groups in the para position to each other. The term "alkoxy hydroquinone" is used herein to define a class of materials including not only the alkoxy derivatives of mono-cyclichydroquinones but also the di- and other poly-cyclichydroquinones such as the alkoxy derivatives of 1,4-di-hydroxy naphthalenes and the like.

Though the alkoxy hydroquinones of my present invention may contain only one alkoxy group, those containing two or more alkoxy groups per molecule have been found particularly effective. The position of these alkoxy groups on the hydroquinone radical appears generally to be of less importance than the number of such groups. Compounds containing two alkoxy groups in the 2,5 positions of hydroquinone have been found desirable and particularly readily prepared.

The alkyl radical or radicals of the alkoxy hydroquinone may, for example, be the methyl, ethyl, propyl, amyl or an even higher alkyl radical. Alkoxy hydroquinone containing the higher alkyl radicals may be used with particular advantage, for instance, where it is desired to increase the solubility of the inhibitor in the particular monomer to be protected and also when it is desirable to increase the boiling point of the inhibitor as when the inhibitor is to be used for the protecton of high boiling monomers during distillation. These alkyl groups may be either straight chain or branched. The selection of an alkoxy hydroquinone of this class containing branched chain alkyl groups is particularly advantageous where increased solubility of the inhibitor is desirable.

An especially advantageous aspect of my present invention is the wide variation of physical properties of the members of my new group of inhibitors. By the proper selection of the alkoxy group or groups substituted in the hydroquinone molecule, my invention provides inhibitors of which the solubilities, boiling points and other physical properties may be varied over a wide range to coincide with the physical properties of the particular monomer which it is desired to protect.

The advantages of selecting an inhibitor having physical properties such that certain relationships exist between the properties of the inhibitor and those of the monomer to be protected are described in my co-pending applications Serial No. 461,449, filed October 9, 1942, now abandoned and Serial No. 467,529, filed December 1, 1942, now Patent No. 2,397,653.

Further, as previously noted, the alkoxy hydroquinones have been found to be particularly effective polymerization inhibitors for the homologues and substituted products of styrene which polymerize more readily than styrene itself. Thus, various dichlorostyrenes are more susceptible to polymerization than is styrene. However, the inhibitors of my present invention have been found capable of thoroughly inhibiting polymerization of these dichlorostyrenes, as well as of the unsubstituted styrenes and similar materials having lower tendencies to polymerize than the dichlorostyrene.

It may be desirable in some instances that my alkoxyhydroquinone inhibitors contain other substituents, such as halogens, hydrocarbon radicals, such as ethyl, phenyl and the like, as well as radicals containing other elements such as nitro groups, amino groups and sulphur-containing groups, in one or more of the remaining open positions of the cyclic nucleus. My present invention contemplates the use of such materials. Substituting elements may, in some instances, be present in the alkyl radicals of the alkoxyhydroquinone, such as halogens, ester groups and the like. An example of such alkoxyhydroquinone thus substituted in the alkyl group, which may be used with advantage, is di-(ethoxyethoxy)hydroquinone.

As previously noted, a particularly desirable subgroup of my improved class of inhibitors is the 2,5-dialkoxyhydroquinones. These materials have the advantage of ease of preparation as well as being highly effective. They may be prepared, for instance, by the condensation of quinone with an alcohol containing the desired alkoxy group. This condensation may be effected by heating, with refluxing, the alcoholic solution of the quinone in the presence of zinc chloride. However, my alkoxy hydroquinones may be prepared by other methods, for example by the partial etherification of polyhydric phenols so as to leave at least two free hydroxy groups in a para position with respect to each other or by the partial de-etherification of the completely etherified polyhydric phenol or by any other known methods.

The optimum proportion of my inhibitor to be used in accordance with my present invention will depend to a considerable extent upon the particular vinyl aromatic compound to be stabilized thereby and, also, upon the treatment to which the vinyl aromatic compound is to be subjected prior to polymerization. Proportions ranging as low as about 0.001% by weight have been found to have a decided effect in deterring polymerization. Generally, proportions less than 1% by weight are sufficient though, in some cases, it may be desirable to use larger proportions, say up to about 5% or more. In instances where the alkoxy hydroquinone of my present invention is insufficiently soluble in the polymerizable materials, a mutual solvent for the inhibitor and the polymerizable monomer may be added.

The incorporation of the inhibitor in the vinyl aromatic compound may be accomplished by conventional methods such as by adding the inhibitor to the latter with agitation or the vinyl aromatic material may be percolated through a layer or bed of the inhibitor.

It is frequently desirable to use one member of my novel class of inhibitors in conjunction with one or more other members of the class. Thus, in the distillation of homologues and substitution products of styrene, such as nuclear dichlorostyrene or Trichlorostyrene, for example, a member of my class of inhibitors, sufficiently non-volatile to remain in the still, one of sufficient volatility to remain in the fractionating column and one of sufficient volatility to pass over with the distillate, may be used with advantage. In some instances, it is possible to select a member of my class of inhibitors of such volatility that it will remain largely in the fractionating column and a small but sufficient quantity will pass over with the distillate. Usually, however, it is desirable, where the vinyl aromatic compound is to be distilled, to use a plurality of the members of my class of inhibitors of such boiling point characteristics, respectively, as to assure complete protection of the vinyl aromatic compound in all stages of the distillation. This is particularly true with respect to the more readily polymerizable vinyl aromatics.

Where desired, a member of my novel class of inhibitors may be used in conjunction with other inhibitors. This may be desirable, particularly where the vinyl aromatic compound is to be distilled. For instance, diethoxyhydroquinone, of my present invention, may be used in conjunction with diamylhydroquinone, or dibutoxyhydroquinone, of my present invention, may be used in conjunction with tertiary butyl catechol.

A particularly desirable aspect of the present invention is that the members of my novel class of inhibitors may readily be removed from the vinyl aromatic compound when it becomes desirable to effect the polymerization or copolymerization thereof. As my inhibitors have at least two free hydroxy groups attached to the aromatic nucleus, they may readily be removed from solution in the polymerizable material by washing with an aqueous solution of an alkaline material, such as caustic soda, sodium carbonate or the like.

The effectiveness of my alkoxyhydroquinones in inhibiting polymerization, as compared with the effectiveness of previously suggested inhibitors, may be demonstrated by adding a given portion of the respective inhibitors to a standardized mixture of isomers of nuclear dichlorostyrene for example, heating the resultant mixture in a boiling water bath and taking samples periodically until a curdy precipitate is formed when a given portion of the sample is added to absolute methanol. For the purposes of such demonstration, tests were conducted in which 0.25% by weight of the inhibitor to be tested was added to the dichlorostyrene mixture, the mixture heated in the boiling water bath and samples of the mixture taken from time to time. Four drops of the respective samples were added to four milliliters of absolute methanol and when a curdy precipitate was obtained, the effectiveness of the inhibitor was deemed to have been dissipated. The results of such tests of 2,5-diethoxyhydroquinone, 2,5-di(beta-methoxyethoxy)hydroquinone and 2,5-di-n-propoxyhydroquinone, of my novel class of inhibitors of four previously suggested inhibitors, and also the induction period of the uninhibited dichlorostyrene are recorded in the following table in which the time in minutes is the period over which the respective mixtures could be subjected to the test conditions before the curdy precipitate was formed:

| Inhibitor | Minutes |
| --- | --- |
| 2,5-Diethoxyhydroquinone | 240 |
| 2,5-Di(beta-methoxyethoxy)hydroquinone | 87 |
| 2,5-Di-n-propoxyhydroquinone | 82 |
| Hydroquinone | 30 |
| Chlorohydroquinone | 10 |
| Catechol | 10 |
| p-tert.-Butylcatechol | 12 |
| None | 3 |

The results of such tests as applied to the inhibiting of polymerization of unsubstituted styrene by the addition of 0.25% by weight of 2,5-di-n-propoxyhydroquinone and 2,5-diethoxyhydroquinone of my class of inhibitors and of the previously suggested di-tertiary-butylcatechol, and also the induction period of uninhibited styrene, are recorded in the following table:

| Inhibitor | Time |
| --- | --- |
| 2,5-Di-n-propoxyhydroquinone | 49 hours. |
| 2,5-Diethoxyhydroquinone | 44 hours. |
| Di-tert.-butylcatechol | 17.5-18 hours. |
| None | 52 minutes. |

The results of these tests serve to illustrate the outstanding value of my alkoxyhydroquinones as inhibitors of polymerization of vinyl aromatic compounds. It will be noted that the period of protection of the dichlorostyrene, under conditions of the test, afforded by the use of 2,5-di-n-propoxyhydroquinone, was almost three times as great as that afforded by the best of these previously proposed inhibitors tested and that the diethoxyhydroquinone was eight times as effective as the best of these previously proposed inhibitors and twenty times as effective as the tertiary-butylcatechol, well known as a polymerization inhibitor.

It will be understood that the intended meaning of the terms "polymerize," "polymerizable" and "polymerization," as used herein, is not restricted to the common dictionary definition, a union between two or more like molecules to form another compound having the same elements in the same proportions but a higher molecular weight and different physical properties, but that such terms are used herein in the more general sense to include inter-polymerization between unlike molecules, as indicated by the context.

I claim:

1. The method of inhibiting the polymerization of a compound of the group consisting of styrene and polymerizable ring chlorinated styrenes which comprises incorporating therein a 2,5-dialkoxyhydroquinone.

2. The method of inhibiting the polymerization of a compound of the group consisting of styrene and polymerizable ring chlorinated styrenes which comprises incorporating therein from .001% to 5% of a 2,5-dialkoxyhydroquinone.

3. The method of inhibiting the polymerization of nuclear dichlorostyrene which comprises incorporating therein a 2,5-dialkoxyhydroquinone.

4. The method of inhibiting the polymerization of nuclear dichlorostyrene which comprises incorporating therein 2,5-diethoxyhydroquinone.

5. The method of inhibiting the polymerization of styrene which comprises incorporating therein 2,5-di-n-propoxyhydroquinone.

6. As a composition of matter, a compound of the group consisting of styrene and polymerizable ring chlorinated styrenes containing a 2,5-dialkoxyhydroquinone, the amount of the 2,5-dialkoxyhydroquinone being sufficient to inhibit the polymerization of the compound.

7. As a composition of matter, a compound of the group consisting of styrene and polymerizable ring chlorinated styrenes containing from .001% to 5% of a 2,5-dialkoxyhydroquinone.

8. As a composition of matter, nuclear dichlorostyrene containing a polymerization-inhibiting amount of a 2,5-dialkoxyhydroquinone.

9. As a composition of matter, nuclear dichlorostyrene containing a polymerization-inhibiting amount of 2,5-diethoxyhydroquinone.

10. As a composition of matter, styrene containing a polymerization-inhibiting amount of 2,5-di-n-propoxyhydroquinone.

EDWIN R. ERICKSON.

REFERENCES CITED

The following references are of record in the file of this patent:

UNITED STATES PATENTS

| Number | Name | Date |
| --- | --- | --- |
| 1,884,559 | Calcott | Oct. 25, 1932 |
| 1,999,830 | Calcott | Apr. 30, 1935 |
| 2,052,859 | Wilson | Sept. 1, 1936 |
| 2,084,754 | Wilson | June 22, 1937 |
| 2,225,471 | Foord | Dec. 17, 1940 |
| 2,310,710 | Rosenwald et al. | Feb. 9, 1943 |

OTHER REFERENCES

Egloff et al.: "Industrial and Engineering Chemistry," vol. 24, pages 1375-81 (1932).